United States Patent [19]

Silberberg

[11] 4,294,752

[45] Oct. 13, 1981

[54] FILLED VINYL CHLORIDE POLYMER COMPOSITION

[75] Inventor: Joseph Silberberg, Brooklyn, N.Y.

[73] Assignee: Stauffer Chemical Company, Westport, Conn.

[21] Appl. No.: 111,626

[22] Filed: Jan. 14, 1980

[51] Int. Cl.³ ............................. C08K 9/04; C08K 5/52
[52] U.S. Cl. ............................... 260/42.14; 260/42.57; 260/42.49; 260/30.6 R
[58] Field of Search ............... 260/42.14, 42.49, 42.57, 260/30.6 R

[56] References Cited

U.S. PATENT DOCUMENTS

| | | | |
|---|---|---|---|
| 4,129,535 | 12/1978 | Elcik | 260/42.49 |
| 4,174,340 | 11/1979 | Lüders et al. | 260/42.14 |
| 4,183,843 | 1/1980 | Koenig et al. | 260/40 R |
| 4,207,225 | 6/1980 | Beacham et al. | 260/30.6 R |
| 4,251,436 | 2/1981 | Silberberg et al. | 260/42.14 |

*Primary Examiner*—Carman J. Seccuro
*Attorney, Agent, or Firm*—Richard P. Fennelly

[57] ABSTRACT

Filled vinyl chloride polymer compositions having improved processability and impact resistance characteristics are formed by incorporation therein of an effective amount for improvement of such characteristics of a composition comprising a lower alkoxylated alkyl acid phosphate ester.

7 Claims, No Drawings

FILLED VINYL CHLORIDE POLYMER COMPOSITION

BACKGROUND OF THE INVENTION

1. Field of the Invention

The present invention relates to filled vinyl chloride polymer compositions having improved processing characteristics and impact resistance.

2. Description of the Prior Art

Inorganic fillers have been used in certain polymers, for example, in vinyl chloride polymers, to impart dimensional rigidity and lower costs to the resulting blend of filler and polymer. Such polymer products find utility as pipe, house siding, window frames, and decorative molding.

When the filler is added to such polymers at even low loadings, however, certain of the physical properties of such polymers (e.g., impact strength) begin to become adversely affected. Also, a large amount of extra energy is needed to uniformly disperse the inorganic filler in the polymer. In order to overcome these shortcomings, it has been proposed that either: (1) a polar copolymer be added during the polymerization of the polymeric material; (2) coupling agents or other additives be added to either the filler, polymer, or filled polymer composition; or (3) the filled formulation be crosslinked (see Handbook of Fillers and Reinforcements for Plastics, edited by H. S. Katz et al., pp. 112-115, 1978).

The prior art has, for example, taught the addition of various types of coupling agents or other additives to the filler material, polymer, or the composite to improve the compatability of the filler and polymer for one another. For example, U.S. Pat. No. 3,926,873 to I. Aishima et al. advocates the use of aliphatic or aromatic carboxylic acids having from 3 to 11 carbon atoms, one or two ethylenic unsaturations, and one or two carboxylic groups as such a class of additive. A family of titanates, available from Kenrich Petrochemicals, Inc., have also been proposed for use as additives to improve the compatability of polymer and filler (Handbook of Fillers and Reinforcements for Plastics, supra.; Modern Plastics, December 1974, p. 68; Modern Plastics Encyclopedia, Vol. 53, No. 10A, October 1976, pp. 161 and 166; and U.S. Pat. Nos. 4,094,853 and 4,098,758).

Although the prior art contains a teaching that certain phosphorous-containing compounds can function as coupling agents or adhesion promoters in adhesive systems (see P. E. Cassidy et al., J. Macromol. Sci., Revs. Polymer Technol. D1(1) pp. 2 and 22-23, 1971), it has not been appreciated that compositions comprising a lower alkoxylated alkyl acid phosphate can be used to improve the compatability of an inorganic filler and a vinyl chloride polymer substrate. For example, U.S. Pat. No. 3,404,023 to M. E. Schrader et al. teaches the use of diethyl phosphite (rather than a phosphate) to improve the compatability of glass fibers with a resin substrate. Also, U.S. Pat. No. 3,344,107 to R. E. Miller teaches the use of various phosphorus-containing compounds containing reactive alkenyl, acrylic or methacrylic groups as coupling agents between a polyamide substrate and a mineral reinforcing agent.

SUMMARY OF THE INVENTION

The present invention is a filled vinyl chloride polymer substrate having improved processing and impact resistance characteristics which comprises a vinyl chloride polymer, filler, and an effective amount of a composition comprising a substantially neutral lower alkoxylated alkyl acid phosphate ester for such effects.

DETAILED DESCRIPTION OF THE INVENTION

The vinyl chloride polymer and filler material which form components in the compositions of the present invention are well-known to persons of ordinary skill in the art.

The term "vinyl chloride polymers" as that term is used herein is intended to encompass polyvinyl chloride homopolymers as well as copolymers of a major amount of vinyl chloride monomer with a minor amount of one or more copolymerizable comonomers. Representative copolymerizable comonomers include: vinyl esters, such as vinyl acetate; the alkyl acrylates and/or methacrylates, such as ethyl acrylate, methyl acrylate, and methyl methacrylate; the dialkyl vinylphosphonates, such as bis(beta-chloroethyl)vinylphosphonate; acrylonitrile, and the like. Chlorinated polyvinyl chloride is also intended to be included. The compositions will generally contain from about 50% to about 99%, by weight of the vinyl chloride polymer.

The type of inorganic filler material which is used in the compositions of the present invention include calcium carbonate, magnesium carbonate, hydrated alumina, silica, alumina silicate, magnesium oxide, magnesium silicate, talc, iron oxide, diatomaceous earth, the hydrated silicates, mica, kaolin, and bentonite. They are in finely divided form (e.g., about 100 microns or less in average particle size). The amount of filler can range from about 1% to about 50%, by weight of the total composition.

In order to achieve the desired improvement in processing and impact resistance for the filled vinyl chloride polymers, the present invention contemplates the presence therein of an effective amount of a composition comprising a substantially neutral lower alkoxylated alkyl acid phosphate ester. The phosphate ester composition is advantageously used to pretreat the filler material prior to its addition to the vinyl chloride polymer, although it can also be added to the filled vinyl chloride polymer mixture. Such phosphate ester compositions can be formed by first reacting a suitable alkyl alcohol with phosphorus pentoxide, for example, at a molar ratio of 2 to 1, to form a dialkyl acid pyrophosphate which can be hydrolyzed, for example, by an equimolar amount of water, to form an alkyl acid phosphate composition. This phosphate composition is then reacted with an appropriate lower alkylene oxide, such as, ethylene oxide, for example, at a molar ratio of 1 to 3, to most commonly yield a mixture of a major amount (e.g., about 65% to about 85%, by weight) of one or more lower alkoxylated alkyl acid phosphate esters in the presence of a minor amount (e.g., about 35% to about 15% by weight) of alkoxylated phosphoric acid and some unreacted alkyl alcohol. This general type of reaction is described in U.S. Pat. No. 2,586,897 to W. H. Woodstock and in "Phosphorus and Its Compounds", John R. Van Wazer, ed., Vol. II, pp. 1227-1229 (Interscience Publishers, Inc., New York, 1961).

The lower alkoxylated alkyl acid phosphate ester has the following formula:

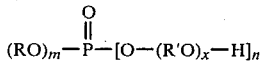

where x is an integer of from 1 to 5, m and n are either 1 or 2, with the sum of m and n being 3, R is a $C_1$–$C_{20}$ alkyl group, and R' is a $C_2$–$C_5$ alkylene group. A suitable composition containing esters of this type is available commercially as VICTAWET 12 from Stauffer Chemical Company (a mixture comprising about 10%–25% by weight di(2-ethylhexyl)hydroxyethyl phosphate and about 50%–65%, by weight, of mono(2-ethylhexyl)hydroxyethyl polyoxyethylene phosphate). Generally, the amount of lower alkoxylated alkyl acid phosphate ester composition in the filled vinyl chloride polymer composition will range from about 0.1% to about 5%, by weight of the filler.

The compositions of the present invention can also include other conventional additives in conventional amounts, such as: plasticizers, flame retardants, lubricants, impact modifiers, stabilizers and the like.

The present invention is further illustrated by the Examples which follow.

EXAMPLES 1–2

These Examples illustrate the improvement in processing for a polyvinyl chloride/calcium carbonate mixture that was treated with a lower alkoxylated alkyl acid phosphate (Example 2) compared to a control formulation not containing the phosphate ester (Example 1).

Both samples comprised medium molecular weight suspension polyvinyl chloride compounded with 4 parts by weight of acrylic impact modifier (ROHM and HAAS KM 323B) 1.5 parts by weight of organotin stabilizer (CINCINNATI MILACRON TM 387), 1 part by weight of calcium stearate lubricant, 1 part of wax lubricant (HOECHST 165), 0.15 part by weight of polyethylene (ALLIED P.E. 629A), 1 part by weight of titanium dioxide pigment, and 30 parts by weight per one hundred parts of resin of a calcium carbonate filler (OMYALITE 90 from Pluess-Staufer), having an average particle size of about one micron. The filler used in Example 2 had been pretreated with 2.5%, by weight of the filler, of a composition comprising a mixture of about 10–15%, by weight, of di(2-ethylhexyl)hydroxyethyl phosphate and about 60%–65%, by weight, of mono(2-ethylhexyl)hydroxyethyl polyoxyethylene phosphate, about 5%–10%, by weight, of 2-ethylhexanol, and about 15%–20%, by weight, of oxyethylated phosphoric acid (VICTAWET 12 from Stauffer Chemical Company), whereas the filler used in Example 1 was not. Example 1 represents the average of two runs.

The following sets forth the processing data for 77 gm. of each mixture when mixed in a Brabender apparatus at 60 rpm. and 175° C.:

| EXAMPLES 1–2 (cont'd.) | | | | | |
|---|---|---|---|---|---|
| | Torque (m-gm.) | | | Time (min.) | |
| Example | Max[1] | Fusion[2] | Equil.[3] | Fusion[4] | Equil.[5] |
| 1 (Control) | 5000 | 3350 | 3150 | 2.3 | 9.0 |
| 2 | 3750 | 3400 | 3120 | 1.8 | 9.5 |

[1] the peak torque reached during onset of fusion.
[2] the torque at the fusion point. It is where the tangent to the torque vs. time curve is 30° to the time axis.
[3] minimum torque level during the fluxing cycle.
[4] the time from introduction of the sample to the fusion point.
[5] the time from the fusion point to the onset of degradation manifested by an increase in torque.

These data indicate that the sample of Example 2 required the exertion of a lower maximum, and equilibrium torque, reached the fusion point more quickly, and had a longer equilibrium time.

| Example | Peak Temp. (°C.) | Compounding Energy[6] (m.-gm.-min.) |
|---|---|---|
| 1 (Control) | 203 | 2140 |
| 2 | 199 | 1050 |

[6] the area under the torque vs. time curve from introduction of the sample to the fusion point above the equilibrium torque value.

These data indicate that the mixture of Example 2 also exhibited a slightly lower peak temperature during mixing and required less compounding energy.

EXAMPLES 3–4

These Examples illustrate the processing values for two mixtures similar to those of Examples 1–2 with the following exceptions: (1) the filler for Example 4 contained 1% by weight of the phosphate composition rather than the 2.5 wt. % level of Example 2; (2) the mixtures of Examples 3–4 were aged for about 2 months prior to being tested, whereas the mixtures of Examples 1–2 were not aged.

| | Torque (m.-gm.) | | | Time (min.) | |
|---|---|---|---|---|---|
| Example | Max. | Fusion | Equil. | Fusion | Equil. |
| 3 (Control) | 4650 | 3600 | 3400 | 2.5 | 9.0 |
| 4 | 4300 | 3450 | 3250 | 2.4 | 7.7 |

These data illustrate that the mixture of Example 4 required the exertion of a lower maximum, fusion, and equilibrium torque.

| Example | Peak Temp. (°C.) | Compounding Energy (m.-gm.-min.) |
|---|---|---|
| 3 (Control) | 203 | 1690 |
| 4 | 201 | 1640 |

The sample from Example 4 exhibited a lower temperature during processing and required a lower compounding energy.

EXAMPLES 5–6

These Examples illustrate falling dart impact and Izod impact values for samples formed from mixtures similar to those of Examples 3 and 4, respectively, processed in a two-roll mill and compression molded.

| | Falling Dart Impact Values[1] | | |
|---|---|---|---|
| Example | Average Thickness (cm.) | Mean Energy Failure (J) | Normalized Mean Failure Energy (J/m) |
| 5 (Control) | 0.175 | 12.3 ± 0.8 | 7028 ± 457 |
| 6 | 0.117 | 13.3 ± 2.6 | 11368 ± 2222 |

[1]test performed on specimens supported on a 2.2 cm. inner diameter ring and impacted by a 1.8 kg. dart with 0.75 cm. radius tip by varying the dropping height. The values indicate the energy at which 50% of the drops result in failure.

| | Izod Impact Values (ft.-lb./in.) | |
|---|---|---|
| Example | Standard[2] | Reversed Notch[3] |
| 5 (Control) | 1.7 | 35 |
| 6 | 2.4 | 50 |

[2]tested in accordance with ASTM D256, Method A, for 0.3175 cm. thick specimens.
[3]same as ($_2$) with the exception that Method E was used.

These data illustrate the superior impact resistance for the specimens made from the mixture of Example 6.

EXAMPLES 7–8

These Examples are a repeat of Examples 1–2 with the exception that the vinyl formulation contained only half the additives (i.e., 2 parts impact modifier, 0.75 part stabilizer, 0.5 part calcium stearate, 0.5 part wax, 0.075 part polyethylene and 0.5 part pigment) with retention of the 30 parts by weight of filler per 100 parts by weight of resin.

| | Torque (m.-gm.) | | | Time (min.) | |
|---|---|---|---|---|---|
| Example | Max. | Fusion | Equil. | Fusion | Equil. |
| 7 (Control) | 6000 | 3550 | 3300 | 2.3 | 7.4 |
| 8 | 4650 | 3300 | 3100 | 2.6 | 8.2 |

These data show that a lower maximum, fusion, and equilibrium torque was required for the mixture of Example 8 and that the equilibrium time was longer.

| Example | Peak Temp. (°C.) | Compounding Energy (m.-gm.-min.) |
|---|---|---|
| 7 (Control) | 206 | 3060 |
| 8 | 203 | 2030 |

The sample from Example 8 showed a lower peak temperature during processing and a lower compounding energy.

The foregoing Examples should not be construed in a limiting manner since they are intended to be exemplary of only certain embodiments of the invention. The scope of protection that is sought is set forth in the claims which follow.

What is claimed:

1. A filled vinyl chloride polymer composition having improved processing characteristics and impact resistance comprising a vinyl chloride polymer, a filler, and an effective amount for said improved processing and impact resistance of a composition comprising a lower alkoxylated alkyl acid phosphate ester having the formula

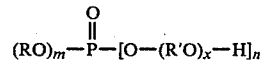

where x is an integer of from 1 to 5, m and n are either 1 or 2, with the sum of m and n being 3, R is a $C_1$–$C_{20}$ alkyl group, and R' is a $C_2$–$C_5$ alkyl group.

2. A composition as claimed in claim 1 wherein the vinyl chloride polymer is present at from about 50% to about 99%, by weight of the composition.

3. A composition as claimed in claim 1 wherein the filler is present at from about 1% to about 50%, by weight of the composition.

4. A composition as claimed in claim 1 wherein the phosphate composition is present at from about 0.1% to about 5%, by weight of the filler.

5. A composition as claimed in claim 1 wherein the vinyl chloride polymer is polyvinyl chloride homopolymer.

6. A composition as claimed in either claim 1, 2, 3, 4, or 5 wherein the filler is calcium carbonate.

7. A composition as claimed in either claim 1, 2, 3, 4, or 5 wherein the phosphate composition comprises a mixture of di(2-ethylhexyl)hydroxyethyl)phosphate and mono(2-ethylhexyl)hydroxyethyl polyoxyethylene phosphate, and the filler is calcium carbonate.

* * * * *

UNITED STATES PATENT AND TRADEMARK OFFICE
CERTIFICATE OF CORRECTION

PATENT NO. : 4,294,752
DATED : October 13, 1981
INVENTOR(S) : Joseph Silberberg

It is certified that error appears in the above—identified patent and that said Letters Patent is hereby corrected as shown below:

Col. 1, lines 37-38, "carboxylic" should be -- carboxyl --;

and

Col. 8, Claim 7, line 3, "di(2-ethylhexyl)hydroxyethyl) phosphate" should be -- di(2-ethylhexyl)hydroxyethyl phosphate--.

Signed and Sealed this

Nineteenth Day of January 1982

[SEAL]

Attest:

GERALD J. MOSSINGHOFF

Attesting Officer    Commissioner of Patents and Trademarks